2,810,680

TREATMENT OF OXO ALDEHYDES WITH MAGNESIA

Karl Büchner, Duisburg-Hamborn, and Paul Kühnel, Oberhausen-Holten, Germany, assignors to Ruhrchemie Aktiengesellschaft, Oberhausen-Holten, Germany, a corporation of Germany No Drawing. Application October 21, 1952,
Serial No. 316,068

Claims priority, application Germany November 5, 1951

1 Claim. (Cl. 202—57)

This invention relates to improvements in the production of aldehydes. It more particularly relates to a process for the production of aldehyde mixtures and aldehydes which are free from metals and acetals.

Aldehydes and aldehyde mixtures may be produced by the catalytic addition of water gas to certain carbon compounds containing olefinic bonds. The catalysts suitable for the catalytic addition include metallic cobalt and/or iron, as well as suitable cobalt and/or iron compounds.

The raw aldehydes or aldehyde mixtures produced by this known synthesis are more or less intensely colored and contain troublesome metallic compounds, which, in subsequent operational steps, may cause undesirable side reactions. Distillates are sometimes obtained from these aldehyde mixtures which retain the metal compounds in solution. When such distillates are allowed to stand for a period of time, metal hydroxides and especially iron and cobalt hydroxide are prone to separate out.

In addition to the aldehydes produced by the catalytic addition of water gas to the unsaturated olefinic carbon compounds, varying amounts of alcohols are also formed. The simultaneous presence of the aldehydes and alcohols presents the possibility of acetal formation. In a great number of cases, such a formation of acetals will occur to a considerable extent. This naturally will reduce the yield of aldehydes recovered.

Attempts have been made to remove the metallic compounds present in the aldehydes and aldehyde mixtures by subjecting the raw aldehydes to a treatment with aqueous solutions of acids or salts. It also has been proposed to purify these aldehydes by treating the raw product with acid compounds in the absence of water, or with hydrogen. While these treatments will effect a more or less extensive removal of the troublesome metallic compounds, the same has no effect on the undesirable acetal formation and will not effect a cleavage of the acetals.

One object of this invention is a process to free the aldehydes or aldehyde mixtures obtained by the catalytic addition of water gas to carbon compounds with olefinic double bonds and suitable to the aldehyde synthesis to remove the undesirable metals, split the acetals and increase the aldehyde yield. This and still further objects will become apparent from the following description:

In accordance with the invention, the raw aldehydes or aldehyde mixtures obtained by the catalytic addition of water gas to the olefinic double bond containing carbon compounds suitable for the aldehyde synthesis are treated with water at an elevated temperature and an increased pressure after the interruption of the water gas treatment. This very surprisingly frees the aldehydes or aldehyde mixtures from the metals and acetals. The acetals are split and at the same time the water acts upon the aldehyde soluble metallic compounds and precipitates the latter in the form of metal hydroxides. In spite of a minor hydrogenation of the aldehydes, the yield thereof increases and the aldehydes recovered by distillation are stable due to their freedom from metals.

Instead of the usual strongly yellow, brown or dark brown color usually present, the aldehydes treated in accordance with the invention have only a faint yellow color. In addition the advantage is obtained that the intermediate formation of acetals can no longer have any disturbing effect since it has absolutely no influence on the yield of pure aldehydes obtained.

The precipitated hydroxides of the metals used as catalysts obtained in accordance with the invention are conveniently combined with the last runnings of the aldehyde distillation, which in addition to small amounts of aldehydes also contains alcohols, and treated with hydrogen at temperatures of about 150° to 200° C. This will result in the production of pure alcohols and the regeneration of the catalysts which may be used for a further aldehyde synthesis.

The treatment of the raw aldehydes or aldehyde mixtures with water in accordance with the invention is effected at temperatures of about 100° to 250° C. and preferably at temperatures of 160° to 230° C. Temperatures of about 200° C. have been found particularly effective. The pressures used for the treatment are usually pressures developed at the increased temperatures and it is preferable that the pressure should not exceed the water vapor pressure obtained at the treating temperature. The water treatment in accordance with the invention should be continued for at least ten minutes and preferably for a period of time of about sixty to one hundred twenty minutes.

It is also possible in accordance with the invention to treat raw aldehyde mixtures which will undergo a hydrolizing cleavage by the action of water. This sometimes results in the formation of valuable organic compounds in pure metal free form which may be only obtained with great difficulty by other methods. In this way it is possible, for example, to obtain branched aldehydes from unsaturated esters or unsaturated ethers. These branched aldehydes may in turn be processed to form other oxygen-containing compounds.

Pure aldehydes and alcohols may be obtained from the Oxo products treated in accordance with the invention by distillation. During this distillation, the accompanying hydrocarbons and other oxygenated compounds formed during the reaction and chiefly consisting of acids and esters are separated. The yield of aldehydes and alcohols obtained by such a distillation does not correspond to the quantity of aldehydes and alcohols analytically determined to be present in the purified Oxo products before the distillation. When subjecting the general viscid residue from the distillation to a treatment with water at an elevated temperature and an elevated pressure, an increased carbonyl and hydroxyl number indicates that acetals have again been formed during the distillation.

This disadvantageous acetal formation may be avoided if, during the distillation of the aldehyde mixtures pretreated in accordance with the invention, the presence of acidly reacting substances which form from the aldehydes by oxidation or by Canizzaro reaction is excluded or the formation thereof is prevented. This may be accomplished with the use of alkaline reacting materials. When using caustic alkalis for this purpose, the quantity should not exceed the quantity required for the neutralization of the acids present since the presence of free alkali will cause the formation of aldols and possibly cause the splitting off of water which will result in a loss of the aldehydes. Alkaline reacting materials which are particularly well suited for excluding the presence of the acidly reacting substances include magnesia or magnesium hydroxide, carboxylic salts of the alkalis or alkaline earths.

In the presence of free magnesia, neither a marked formation of aldols occurs nor are acetals formed by the aldehydes and alcohols present. Under these conditions the total quantity of aldehydes and alcohols present in the reaction mixture may be recovered by distillation. Other alkaline reacting materials which do not have a disturbing effect on the aldehyde mixture or the fractions recovered therefrom may be used instead of magnesia. If amines are produced from the aldehydes recovered, then a new formation of acetals may be advantageously prevented by adding a small quantity of amines.

The process described above allows various modifications within the scope of the idea of the invention.

The quantities of water used for the treatment of the raw aldehydes or aldehyde mixtures may amount to 5–300% of the aldehydes to be treated. Particularly convenient is the use of 10% of water calculated on the weight of the aldehyde mixture.

The treatment of the aldehydes or aldehyde mixtures with water is effected in a closed vessel. In doing this, the pressure is allowed to increase to 6–50 kilograms/sq. cm. and preferably to 15–25 kilograms/sq. cm. This pressure is produced not only by the water vapor but also by the organic compounds present in the reaction mixture.

The concentration in hydrogen ions should amount to pH=6.5 to 9.1. Of particular advantage are pH values of 7 to 8.

Before the distillation, carboxylic salts of the alkali metals or alkaline earth metals such as formates, acetates, propionates, butyrates and the corresponding salts of still higher carboxylic acids may be added to the aldehyde mixtures freed from their content of metals and acetals.

The magnesia is conveniently added in the form of MgO. Since the products to be distilled contain always small amounts of water, magnesium hydroxide may partially form during the distillation. As already mentioned, ammonia and amines may be used instead of magnesia. Suitable amines are, for example, methylamine, ethylamine, propylamine, aniline, pyridine, diamines and other primary, secondary or tertiary amines.

The raw aldehydes contain acetals and diethers which are not discernible as such by carbonyl or hydroxyl numbers. The cleavage of the acetals is indicated by the increase of the carbonyl numbers and hydroxyl numbers. Theoretically, one calculates for a carbonyl number twice as great as the hydroxyl number. In the following examples, the increase of the two numbers does not always correspond to this ratio because partially water-soluble aldehydes and alcohols form.

The last fractions distilling over in the treatment of the aldehydes and aldehyde mixtures in accordance with the invention mostly contain already considerable quantities of alcohols in addition to aldehydes.

A process is known which frees the reaction products obtained in the Oxo synthesis from dissolved cobalt carbonyl compounds by means of superheated steam. In this process, the cobalt is separated in the metallic form. As contrasted to the known process, the process in accordance with the invention does not convert the cobalt compounds dissolved in the Oxo products into cobalt metals but into cobalt-oxygen compounds, especially into cobalt oxide and cobalt hydroxide, which may be particular ease be processed to give Oxo catalysts. Simultaneously with this conversion a cleavage of the acetals present in the raw aldehydes occurs.

The following examples are given by way of illustration and not of limitation.

Example 1

2500 cc. of a mono-olefinic terpene of the empirical molecular formula $C_{10}H_{16}$ were subjected in the conventional manner to the addition of water gas in the presence of a suspended cobalt-magnesia-kieselguhr catalyst in an autoclave. The catalyst contained 12.5 parts of magnesia and 200 parts of kieselguhr for every 100 parts of cobalt.

After the termination of the water gas addition, the reaction mixture had the following characteristics:

Carbonyl number_____ 156.
Hydroxyl number_____ 14.
Color _____ Dark brown.

After having released the residual water gas pressure, 200 cc. of water were injected into the liquid reaction mixture remaining in the pressure vessel and the mixture was heated to 200° C. with constant stirring. After one hour, the pressure vessel was cooled and the reaction product was separated from the catalyst. 2300 cc. of a nearly colorless aldehyde were obtained having the following characteristics:

Carbonyl number_____ 161
Hydroxy number_____ 30

By distillation, the following fractions were obtained:

|  | Carbonyl number | Hydroxyl number |
|---|---|---|
| First runnings | 10 | 0 |
| Aldehyde fraction | 312 | 4 |
| Last runnings | 173 | 144 |
| Residue | 37 | 50 |

The last runnings amounting to 7% by volume of the reaction product were subjected together with the separated catalyst to a treatment with a hydrogen-nitrogen mixture in a pressure vessel at a pressure of 50 kilos/sq. cm. and separated, after cooling, from the catalyst. Thereafter, the carbonyl number was nearly zero, the hydroxyl number was 320. The separated catalyst which, by the action of hydrogen, had been regenerated, could be used for a new addition of water gas since it had regained its full activity.

Example 2

1000 cc. of a $C_9$ fraction which had been obtained by the hydrogenation of carbon monoxide by means of the conventional iron catalysts and contained approximately 50% of olefinic hydrocarbons were treated with water gas in a pressure vessel of chrome-nickel steel having a capacity of 4000 cc. Before the entrance into the pressure vessel, the water gas streamed at a temperature of 160° C. through a pressure tube filled with cobalt iodide and copper powder. In this way, the olefinic hydrocarbon mixture in the chrome-nickel steel container was treated for 4 hours at a pressure of 250 kilos/sq. cm. and a temperature of 160° C. with water gas which contained volatile cobalt carbonyl compounds. After the termination of the water gas treatment, the reaction mixture had the following characteristics as compared with the starting material:

|  | Before the treatment | After the treatment |
|---|---|---|
| Color | Colorless | light yellow. |
| Iodine number | 113 | 10. |
| Neutralization number | 0 | 5. |
| Ester number | 1 | 4. |
| Hydroxyl number | 6 | 0. |
| Carbonyl number | 6 | 167. |
| Cobalt content | 0 | 10 mg./liter. |
| Iron content | 0 | trace. |

After having released the water gas pressure, 200 cc. of water were passed into the pressure vessel and heated with the reaction product to 200° C. while intensively stirring. After this treatment, the reaction product was freed by distillation from the turbidity caused by precipitated cobalt hydroxide. A water-white aldehyde mixture remained having the following characteristics:

| | |
|---|---|
| Iodine number | 10 |
| Neutralization number | 3 |
| Ester number | 3 |
| Hydroxyl number | 22 |
| Carbonyl number | 172 |
| Cobalt content | 0 |
| Iron content | 0 |

By distilling this product, 88% of the theoretically possible quantity of metal-free $C_{10}$ aldehyde were obtained in the first distillation. In addition, approximately 10% of a mixture consisting of $C_{10}$ aldehyde and $C_{10}$ alcohol were obtained as last runnings.

*Example 3*

300 cc. of a $C_6$ fraction consisting of paraffin and olefin hydrocarbon were mixed, in a steel pressure vessel of a capacity of 2000 cc., with the same quantity of an aqueous, weakly acid cobalt sulfate-magnesium sulfate solution which contained 15 gms. of cobalt and 15 gms. of magnesium oxide per liter. The $C_6$ fraction contained 65% olefins and had the following characteristics:

| | |
|---|---|
| Density at 20° C | 0.670 |
| Iodine number | 205 |
| Neutralization number | 0 |
| Ester number | 1 |
| Hydroxyl number | 0 |
| Carbonyl number | 4 |

The mixture consisting of the $C_6$ fraction and the metallic salt solution was heated to 140–145° C. and treated with water gas for three hours under a pressure of 150–200 kilos/sq. cm. Thereafter, the reaction mixture was cooled, separated from the catalyst solution and treated with water for two hours while being heated to 200° C. The following results were obtained:

| | Before the treatment with water | After the treatment with water |
|---|---|---|
| Iodine number | 1 | 1. |
| Neutralization number | 2 | 2. |
| Ester number | 2 | 2. |
| Hydroxyl number | 0 | 82. |
| Carbonyl number | 218 | 246. |
| Cobalt content | 15 mg./liter | free from cobalt. |

Before the treatment with water, the carbonyl number corresponded to an aldehyde content of 44.5%. After the treatment with water, the carbonyl number indicated an aldehyde content of 50%. By the treatment with water according to the invention, about 17% of alcohols had in addition become obtainable because of the cleavage of acetals occurred by said treatment. The metallic compounds of the raw aldehyde were completely precipitated.

*Example 4*

By means of the Oxo synthesis, a raw aldehyde mixture of the molecular size $C_7$ was obtained by the addition of carbon monoxide-hydrogen to a paraffin-olefin cut $C_6$ having an iodine number of 204 and prepared by fractionating products from the hydrogenation of carbon monoxide with iron catalysts after having removed therefrom the alcohols. This reaction product was mixed with half its volume of water and heated for one hour to 170° C. whereby a pressure of 17 kilos/sq. cm. developed. Thereafter, the raw aldehyde separated from the water had the following characteristics:

| | |
|---|---|
| Iodine number | 0 |
| Neutralization number | 9 |
| Ester number | 13 |
| Hydroxyl number | 72 |
| Carbonyl number | 223 |
| Refractive index, $n_D^{20}$ | 1.4148 |

This raw aldehyde was fractionated with the addition of 0.5% by weight of magnesia. After the separation of the first runnings amounting to 35% by volume and substantially consisting of $C_6$ paraffin hydrocarbons, 49.5% by volume of $C_7$ aldehyde were recovered under a pressure of 100 mm. Hg at a boiling range of 80–92° C. This aldehyde had the following characteristics:

| | |
|---|---|
| Carbonyl number | 458 (about 93.5% $C_7$ aldehyde). |
| Hydroxyl number | 31 (about 6.4% $C_7$ alcohol). |
| Density at 20° C | 0.828. |
| Refractive index, $n_D^{20}$ | 1.4152. |

Approximately 15% by volume of viscid products remained as the residue from distillation, consisting of magnesia salts, esters and small amounts of polymeric compounds. If this residue from distillation, after acidification, was treated with the same volume of water at a temperature of 170° C., a further increase in hydroxyl and carbonyl number could not be observed. Hence, the residue was free from acetals.

*Example 5*

From 1 kilo of camphene having an iodine number of 167 and a melting point of 36.9° C. corresponding to a content of 89.5% of pure camphene, the formyl camphene aldehyde $C_{11}H_{18}O$ was prepared by oxidation. After the separation of the aqueous acid cobalt sulfate solution used as the catalyst, the raw aldehyde was mixed with 300 cc. of water and heated for 1 hour to 180° C. in a pressure vessel. Thereafter, the raw aldehyde was free from metals and acetals and was mixed with 5 gms. of magnesia (MgO) and fractionated.

After the first runnings which boiled between 141° and 163° C. and comprised 20% by volume of the starting material, 71% by volume of aldehyde-alcohol mixture were obtained at a pressure of 10 mm. Hg. This corresponded to a yield of 80% by volume referred to 100% camphene.

The aldehyde-alcohol fraction was again fractionated at a pressure of 50 mm. Hg with the addition of 2 gms. of magnesia (MgO). At a temperature of 140° C., about 70% by volume of an aldehyde of the formula $C_{11}H_{18}O$ were obtained having the following characteristics:

| | |
|---|---|
| Carbonyl number | 314 (about 93% aldehyde). |
| Hydroxyl number | 22 (about 6.5% alcohol). |
| Iodine number | 0. |
| Density at 20° C | 0.968. |
| Refractive index, $n_D^{20}$ | 1.4807. |

The residue from distillation was hydrogenated in the conventional manner using a magnesia-kieselguhr catalyst and resulting in approximately 25% by volume of an alcohol of the formula $C_{11}H_{20}O$ having the following characteristics:

| | |
|---|---|
| Hydroxyl number | 326 (about 98% alcohol). |
| Carbonyl number | 2. |
| Iodine number | 0. |
| Density at 20° C | 0.969. |
| Refractive index, $n_D^{20}$ | 1.4882. |
| Boiling range | 155–159° C. at 50 mm. Hg. |

If the distillations were effected without the addition of magnesia, then the yield of aldehyde-alcohol fractions decreased from 70% by volume to 45% by volume.

We claim:

In the process for the treatment of aldehyde containing reaction products from the catalytic addition of water gas to carbon compounds containing olefinic double bonds in which such a reaction product is treated with water at a temperature in excess of 100° C. and a pressure in excess of the vapor pressure of the water at said temperature to maintain said water in the liquid phase, the improvement which comprises distilling such a reaction product in the presence of magnesia, and recovering an acetal-free reaction product.

References Cited in the file of this patent

UNITED STATES PATENTS

| | | |
|---|---|---|
| 2,636,903 | Mertzweiller | Apr. 28, 1953 |
| 2,638,487 | Russum et al. | May 21, 1953 |
| 2,679,534 | Koontz | May 25, 1954 |
| 2,686,206 | Cerveny | Aug. 10, 1954 |
| 2,688,591 | Hill | Sept. 7, 1954 |
| 2,694,734 | Hagemeyer et al. | Nov. 16, 1954 |
| 2,694,735 | Hull et al. | Nov. 16, 1954 |

FOREIGN PATENTS

| | | |
|---|---|---|
| 660,737 | Great Britain | Nov. 14, 1951 |